Figure 3:
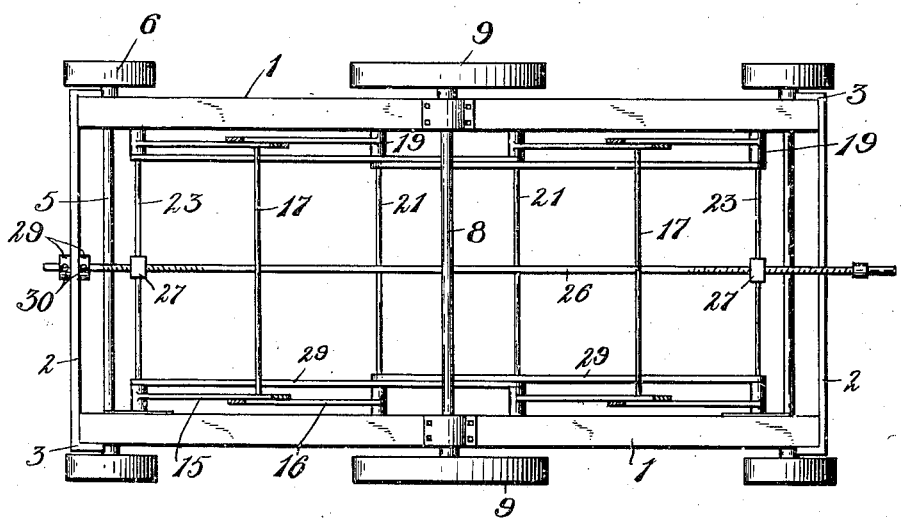

No. 848,332. PATENTED MAR. 26, 1907.
B. L. WESTERVELT.
TRUCK FOR BAGGAGE, &c.
APPLICATION FILED DEC. 17, 1906.
2 SHEETS—SHEET 1.
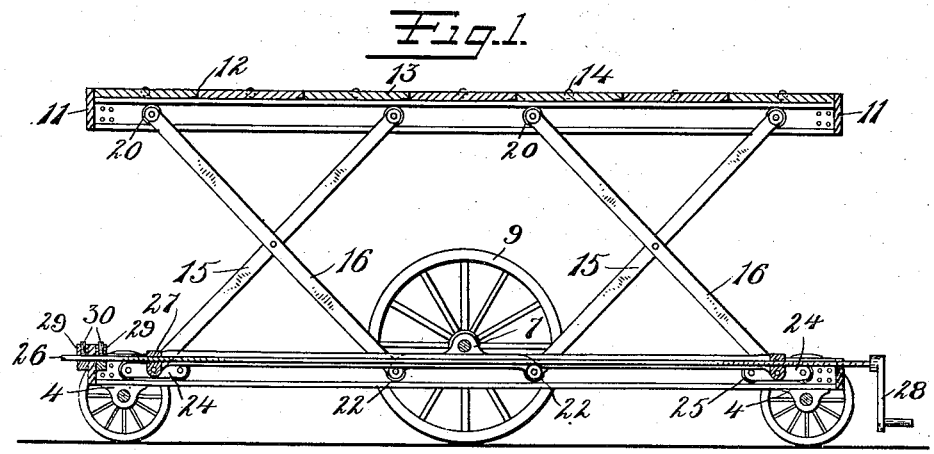
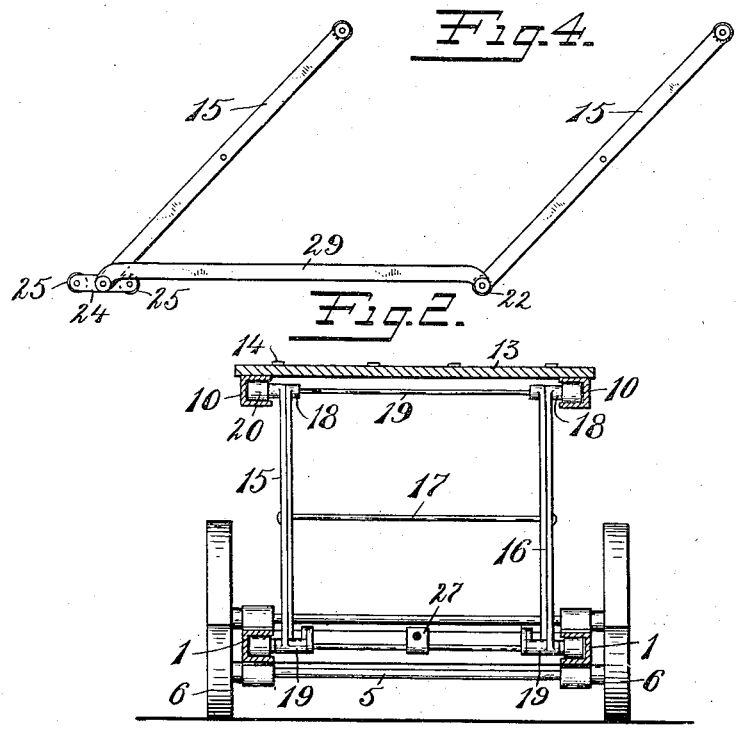
Witnesses
Inventor
B. L. WESTERVELT
By his Attorneys No. 848,332. PATENTED MAR. 26, 1907.
B. L. WESTERVELT.
TRUCK FOR BAGGAGE, &c.
APPLICATION FILED DEC. 17, 1906.

2 SHEETS—SHEET 2.

Witnesses Inventor
B.L. Westervelt
By his Attorneys

UNITED STATES PATENT OFFICE.

BENJAMIN L. WESTERVELT, OF NEW YORK, N. Y.

TRUCK FOR BAGGAGE, &c.

No. 848,332.

Specification of Letters Patent.

Patented March 26, 1907.

Application filed December 17, 1906. Serial No. 348,099.

*To all whom it may concern:*

Be it known that I, BENJAMIN L. WESTERVELT, a citizen of the United States, residing at New York city, New York county, New York, have invented certain new and useful Improvements in Trucks for Baggage, &c., of which the following is a full, clear, and exact description.

The object of my invention is to provide a truck for baggage or the like with a horizontally-adjustable floor or platform in order that the truck may be loaded while the platform is depressed and then elevated to the height of the baggage-car door or wagon and the load delivered without unnecessary handling.

Figure 1 is a sectional side view of a truck constructed in accordance with my invention. Fig. 2 is an end view of the same with the end braces removed. Fig. 3 is a plan view of the base with the upper frame removed to show the connections for elevating and depressing the same. Fig. 4 is a detail of the connections between the lazy-tongs on one side.

1 1 are the side beams of the base-frame, preferably made of channel-irons facing each other, as shown in Fig. 2.

2 2 are end braces secured to the side beams and are bent over at 3 3 to engage and clamp the ends of said side beams.

At each end of the beams 1 1 depend brackets 4, provided with bearings for the shafts 5 5 of the wheels 6.

Intermediate the ends each side beam 1 supports a bracket 7, provided with bearings for the shaft 8 of the large center wheels 9.

The frame of the adjustable platform or floor of the truck is formed of two side beams 10 10, preferably channel-iron, facing each other, similar to the base-beams 1 1 and similarly connected at the ends by braces 11 11. The side beams are further braced by a number of transverse angle-irons 12, secured to the upper side of the channel-irons and upon which the wooden floor 13 is secured. A series of rollers 14 may be provided upon the floor 13 to facilitate the moving of the load placed thereon.

The platform-frame and the base-frame are connected by two corresponding pairs of lazy-tongs on each side. Each pair of lazy-tongs consist of two members 15 and 16, pivoted at their center on the cross-bar 17, joining the corresponding pairs. The upper extremities of each member 15 and 16 is provided with a bushing 18. A shaft 19 passes through the bushing 18 of the corresponding members on each side and carrying rollers 20 20, adapted to operate between the flanges of the channel-irons 10 10. The lower extremities of members 16 16 are each provided with similar bushings 19, surrounding shafts. The two shafts 21 nearest the center of the base-frame are each provided with rollers 22, adapted to operate between the flanges of the channels on the side beams 1 1 of the base-frame. The outer shafts 23 pass through the bushing on the outer lower ends of the members 15 and 16 and are secured at each end to the longitudinal plates 24. Each of these plates carry two rollers 25, adapted to operate between the flanges of the channel-irons 1 1, as clearly shown in Fig. 1. By these lazy-tongs and rollers the platform is secured to the base-frame, and any movement of the platform will be in a plane parallel to the base-frame.

The elevation or depression of the platform is accomplished by the shaft 26, provided with right and left handed screw-threaded portions at the ends engaging correspondingly-threaded blocks 27 27, mounted upon each of the shafts 23. A crank 28 is applied to either end of the shaft, and it is obvious that by turning the same the screw-threaded blocks will be drawn together or forced apart and the platform elevated or depressed, as the case may be, by the action of the lazy-tongs. To distribute the strain more evenly between all the lazy-tongs, the outer lower end of each member is connected to the inner lower end of the corresponding member of the other pair on the same side by a bar 29, passing over the shaft 21 and curved downwardly at the ends to engage the shafts 21 and 23, as shown in detail in Fig. 4.

The operation of the device is as follows: Supposing the platform to be depressed, then the lazy-tongs will be opened to their farthest extent, and to elevate the platform it is only necessary to rotate the shaft 26 by the handle 28, which will draw the lower ends of the lazy-tongs together, and thus elevate the platform. When it is desired to depress the platform, it is only necessary to rotate the shaft 26 in the opposite direction.

To overcome any tendency on the part of the shaft 26 to longitudinal movement in either direction caused by overloading one end of the truck, two adjustable collars 29 are secured to the shaft by set-screws 30 on both sides where it passes through the end base 2. These collars may be placed at either end or on both ends and form a thrust-bearing for the shaft.

What I claim is—

1. In a truck, the combination of a base supported on wheels, a base-frame composed of side beams and end braces, said side beams provided with upper and lower inturned members, a platform composed of side beams provided with upper and lower inturned members and end braces, a plurality of corresponding pairs of lazy-tongs connecting the corresponding side beams of the base-frame and platform, means connecting the corresponding members of each pair of lazy-tongs on the same side and means for simultaneously opening or closing said pairs of lazy-tongs.

2. In a truck, the combination of a base-frame provided with side beams having inturned members, a platform provided with similar side beams and inturned members, a plurality of corresponding pairs of lazy-tongs on each side, carrying rollers adapted to operate between the said inturned members of said side beams, means connecting the corresponding members of each pair of lazy-tongs on the same side and means to operate said lazy-tongs to elevate or depress said platform.

3. In a truck, the combination of a base-frame, a platform, a plurality of corresponding lazy-tongs on each side connecting the platform and base-frame, means on each side connecting the lower ends of the corresponding members of each pair of lazy-tongs on the same side and additional means to operate said lazy-tongs to elevate or depress the platform.

4. In a truck, the combination of a base-frame, a platform, a plurality of corresponding lazy-tongs on each side connecting the platform and base-frame, shafts connecting the extremities of the corresponding members of each opposing pair of lazy-tongs, means on each side connecting the lower ends of the corresponding members of each pair of lazy-tongs on the same side, a longitudinal shaft passing above the lower connecting-shafts provided at the ends with right and left handed screw-threaded portions engaging correspondingly screw-threaded blocks secured to the shafts joining the outer lower lazy-tong members.

5. In a truck, the combination of a base-frame provided with side beams having inturned members, a platform provided with similar side beams having inturned members, a plurality of corresponding lazy-tongs on each side, each member of said lazy-tongs provided with a bushing, a shaft passing through the bushing of each correspondingly opposing member, rollers mounted on the ends of said shafts adapted to operate between the said inturned members of the said side beams, means provided on each side to connect the lower corresponding shafts of each pair of lazy-tongs, a longitudinal shaft provided at either end with a right and left hand screw-threaded portion engaging a similarly screw-threaded block secured to the outer lower lazy-tong members and a crank to operate said shaft.

6. In a truck, the combination of a base-frame provided with side beams having inturned members, a platform provided with similar side beams having inturned members, a plurality of corresponding lazy-tongs on each side, shafts passing through the corresponding opposing extremities of each member of said lazy-tongs, rollers mounted on each of said shafts passing through the upper extremities of the lazy-tong members adapted to operate between the inturned members of the side beams of the platform, a bracket secured to each end of the shaft passing through the lower outer lazy-tong member, said bracket supporting two rollers adapted to operate between the inturned members of the side beams of the base-frame, rollers mounted on the shafts passing through the lower inner lazy-tong members adapted to operate between the said inturned members of the said side beams of the base-frame and means to operate said lazy-tongs to elevate or depress said platform.

BENJAMIN L. WESTERVELT.

Witnesses:
LANGDON MOORE,
L. VREELAND.